United States Patent [19]

Voss

[11] Patent Number: 5,396,514
[45] Date of Patent: Mar. 7, 1995

[54] EXCIMER LASER COMPRISING A GAS RESERVOIR AND A COLLECTING RECEPTACLE AND A METHOD OF REFILLING THE GAS RESERVOIR OF THE LASER WITH HALOGEN GAS

[75] Inventor: Frank Voss, Gottingen, Germany

[73] Assignee: Lamba Physik Gesellschaft zur Herstelling von Lasern mbH, Gottingen, Germany

[21] Appl. No.: 24,629

[22] Filed: Mar. 1, 1993

[30] Foreign Application Priority Data

Mar. 4, 1992 [DE] Germany .................. 42 06 803.7

[51] Int. Cl.6 .................. H01S 3/22; H01S 3/223
[52] U.S. Cl. .................. 372/57; 372/59; 372/60
[58] Field of Search .................. 372/57, 59, 60

[56] References Cited

U.S. PATENT DOCUMENTS 5,005,181  4/1991  Yoshioka et al. .................. 372/57
5,090,020  2/1992  Bedwell .................. 372/57
5,199,267  4/1993  Mitsui .................. 372/57
5,220,574  6/1993  Voss et al. .................. 372/57

FOREIGN PATENT DOCUMENTS 263994   3/1991  European Pat. Off. .
430411   6/1991  European Pat. Off. .
9106909 10/1992  Germany .

Primary Examiner—Rodney B. Bovernick
Assistant Examiner—Robert E. Wise
Attorney, Agent, or Firm—Michael N. Meller

[57] ABSTRACT

An excimer laser including a gas reservoir in which gas discharge is effected with the participation of halogen gas, comprises a collecting receptacle which communicates both with the gas reservoir and a halogen gas supply through conduits provided with shutoff valves. This apparatus is suitable for carrying out a method of refilling the gas reservoir of the excimer laser with halogen gas even if the pressure of the halogen gas supply is low and its volume restricted.

15 Claims, 3 Drawing Sheets

EXCIMER LASER COMPRISING A GAS RESERVOIR AND A COLLECTING RECEPTACLE AND A METHOD OF REFILLING THE GAS RESERVOIR OF THE LASER WITH HALOGEN GAS

FIELD OF THE INVENTION

The instant invention relates to an excimer laser comprising a collecting receptacle which communicates both with the gas reservoir of the laser and with a halogen gas supply. The invention also relates to a method of refilling the gas reservoir of the laser with halogen gas.

BACKGROUND OF THE INVENTION

In excimer lasers, as is well known, a lasing medium is generated by highly excited excimer molecules being formed in the plasma of a gas discharge to which noble gas atoms and e.g. halogens or hydrogen halides (plus other reactants) contribute.

The lifetime of excimer laser gases is limited mainly by two processes. On the one hand, obscure chemical reactions between the halogen and the container do take place even in well passivated systems, entailing consumption of the halogen and a rise of the contamination level. On the other hand, chemical reactions are caused also by the minor electrode burn-off which takes place during high voltage discharge. The loss in laser performance in the course of time is compensated—normally by user-friendly and efficient computer control systems—by raising the charging voltage of the laser and/or regenerating the laser gas or replacing it in part or totally.

The operating pressure of an excimer laser typically is from 2.8 to 3.8 bars, absolute. While supplying halogen by means of pressure cylinders (usually containing $F_2$ and HCl gases diluted with helium) permits operating at high pressures in filling or refilling the laser gas reservoir, a more recently suggested way of supplying the gas by producing the desired halogen in situ (see e.g. German patent application P 40 36 963.3) provides the gas approximately at room temperature and at pressures of from a few millibars to a few 100 millibars at volumes which can be handled, ranging from about 100 to 500 $cm^3$.

These pressures are sufficient for charging a laser reservoir (typically containing from about 30 to 60 liters), a procedure which starts from an absolute pressure of about 20 mbar, provided the halogen portion (e.g. $F_2$ or HCl) is filled in first and then the noble or buffer gas share is added until the final operating pressure is reached. Once it is reached, the laser usually is started and continues to run for several millions of impulses, with or without cleansing of the gas, until the halogen concentration has become so reduced that control of the laser output performance level can be achieved only by halogen injection. In other words, the gas reservoir of the laser must be recharged with halogen (such as $F_2$ or HCl) for the performance to be maintained. This halogen injection which either may be only $F_2$ or only HCl, depending on the operating gas, normally accounts for no more than a fraction (approximately 1/10 to $\frac{1}{2}$) of the halogen partial pressure required for a complete gas exchange, which typically is 5 mbar in the gas reservoir of the laser.

With the laser in operation, this quantity cannot be refilled without much compression of the halogen if the halogen, for instance, comes from a gas generator providing the same in situ.

SUMMARY OF THE INVENTION

It is, therefore, an object of the invention to provide an apparatus by means of which a sufficient quantity of halogen can be suplied to the laser reservoir when the laser gas needs freshing up or partial or complete substitution thereof is required. It is another object of the invention, to devise the apparatus such that the above can be accomplished even if only relatively small volumes (e.g. from about 50 to about 1000 ml) of the halogen gas are available and/or if the halogen gas is available only at relatively low pressures (e.g. from about 1 mbar to 1000 mbar). It is yet another object of the invention to suggest a method by means of which the laser reservoir can be filled with halogen gas also under the above conditions.

The above and other objects which will become apparent as the description proceeds are met, in accordance with the invention, by the provision of an excimer laser comprising a gas reservoir wherein a collecting receptacle is arranged between the halogen gas supply and the gas reservoir and communicates both with the gas reservoir and the halogen gas supply via conduits provided with shutoff valves.

Specific modifications of this apparatus are presented in claims 2 to 14.

The invention further provides a method of refilling the gas reservoir of an excimer laser with halogen gas, comprising the following steps:

(a) halogen gas from a halogen gas supply is introduced into an evacuated collecting receptacle, at a lower pressure than the operating pressure in the gas reservoir of the excimer laser, (b) a conduit between the collecting receptacle and the halogen gas supply is blocked by closing a valve, (c) the collecting receptacle is connected to the gas reservoir of the excimer laser by opening one or more valves, (d) the gas conduit(s) between the collecting receptacle and the gas reservoir is/are blocked by closing the valve or valves, (e) the collecting receptacle is evacuated.

Specific modifications of this method are presented in claims 16 to 21.

The method according to the invention of refilling the reservoir of an excimer laser with halogen gas preferably is carried out by means of the apparatus specified.

The expression "halogen gas supply" as used here is understood to include both pressure tanks containing pure or diluted halogen gases and apparatus by means of which halogen gases are generated in situ, either constantly or as may be required, such as by passing a hydrolyzable substance which contains halogen atoms over a substance which contains water (see e.g. German patent application P 40 36 963.3) or by heating a metal halide (see e.g. German patent application P 41 36 272.1). The term "halogen gas" is understood as comprising all those gases or gas mixtures containing halogens which are suitable for use in an excimer laser, such as $F_2$ or HCl.

DESCRIPTION OF PREFERRED EMBODIMENTS

The excimer laser according to the invention and the method of refilling it with halogen gas will be described further with reference to the accompanying drawings.

Figure 1:
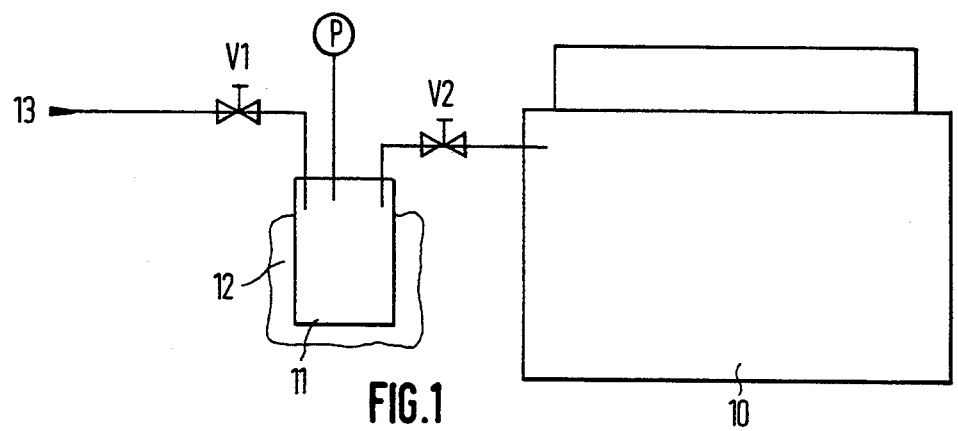
FIG. 1 shows a first embodiment of the invention.

FIG. 1 illustrates the parts of interest here, belonging to an excimer laser, which includes a collecting receptacle 11 communicating with a halogen gas supply 13 (not shown) through a gas conduit adapted to be blocked by a valve V1. Preferably, the collecting receptacle 11 is provided with a connection for pressure measurement. A heater 12 may be provided optionally. The collecting receptacle 11 communicates with the gas reservoir 10 of the excimer laser through a valve V2.

The collecting receptacle 11 is evacuated prior to being filled. That is accomplished by means of a vacuum device (not shown in the figure) connected to the halogen gas supply 13. When a halogen injection is required, first of all the valve V1 is manipulated to adjust the pressure p in the collecting receptacle 11 in accordance with the desired quantity of halogen to be injected, while valve V2 remains closed. This pressure is much lower than the operating pressure in the gas reservoir of the excimer laser in operation. Upon closing of valve V1, valve V2 is opened. The gas mixture from the reservoir 10 now passes into the collecting receptacle 11 where it mixes with the halogen present, at simultaneous pressure balancing. The vortex formation during this pressure balancing phase causes some of the halogen to pass from the collecting receptacle 11 through the connecting line into the reservoir 10.

As valve V2 continues to be open, more halogen passes into the reservoir 10 by diffusion due to the halogen concentration gradient. The time required for this process to take place ranges from a few seconds to several hours, depending on the temperature difference. For this reason it may be advantageous to speed up the process by heating the collecting receptacle 11 (e.g. by heater 12). Once valve V2 has been closed, the collecting receptacle 11 can be evacuated again and then charged.

The other figures illustrate embodiments of the apparatus suitable for speeding up and supplementing the transfer of halogen gas into the laser gas reservoir, in comparison with the method described above. In the figures, corresponding items are marked by the same reference numerals.

Figure 1A:
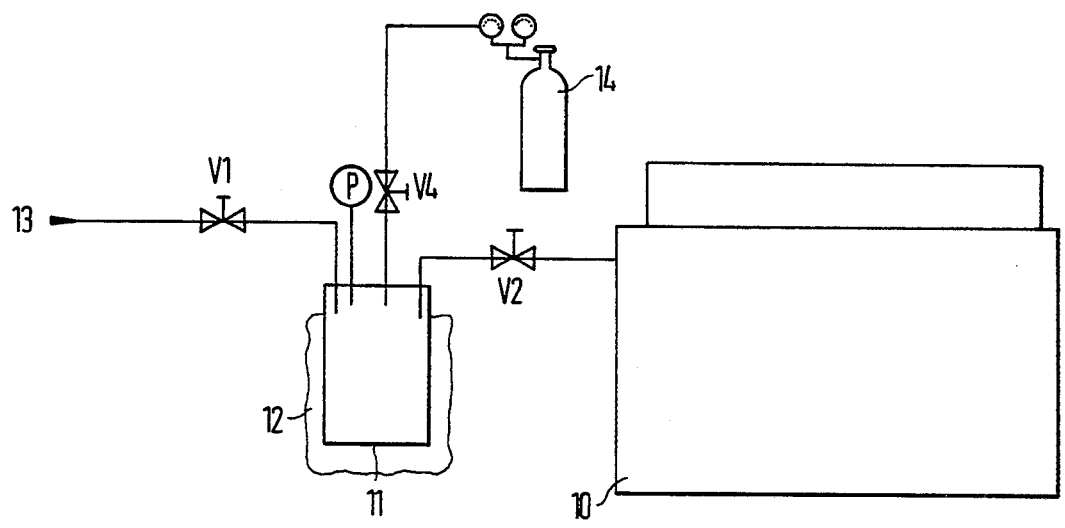
FIG. 1A shows a second embodiment of the invention.

FIG. 1a shows an excimer laser as illustrated in FIG. 1 with the collecting receptacle 11 being connected, in addition, by a conduit provided with a valve V4 to a buffer gas bottle (pressurized cylinder) or noble gas bottle 14.

The backup pressure of the pressurized cylinder 14 is adjusted at a distinctly higher value than that of the pressure prevailing in the laser gas reservoir 10 to make sure that gas will flow through the collecting receptacle 11 in the direction of the reservoir 10.

The valves V2 and V4 are closed to begin with. When the required halogen gas pressure p in the collecting receptacle 11 has been reached by way of valve V1, this valve is closed, while valves V2 and V4 are opened.

The gas which flows from the pressurized cylinder 14 into the collecting receptacle 11 entrains the halogen into the reservoir 10. The flow continues until the pressure rise in the reservoir (controlled from the laser end) has reached a certain value which depends on the gas mixture (e.g. 1% of the prevailing instantaneous pressure). Thereupon valve V4 is closed as well as valve V2. The buffer gas or noble gas then is pumped out of the collecting receptacle 11 through valve V1. The collecting receptacle thus is ready for a new injection of halogen gas.

Figure 2:
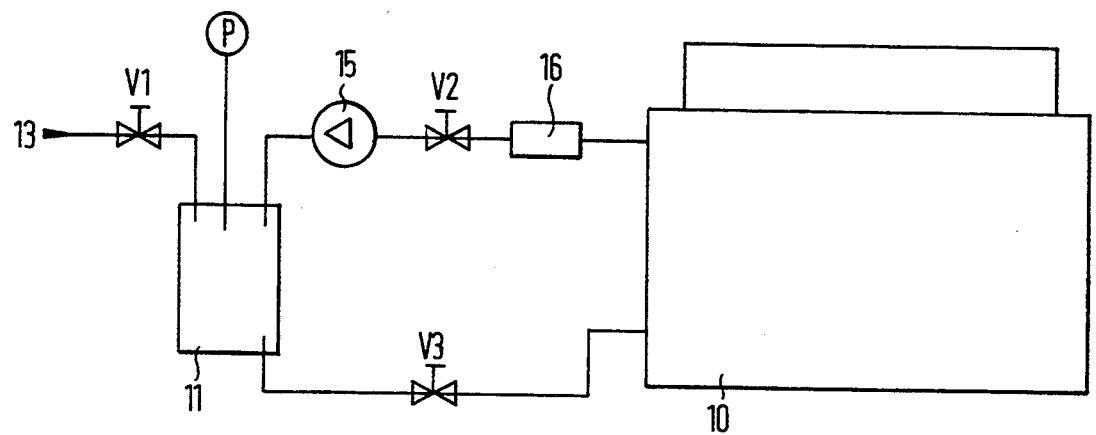
FIG. 2 shows a third embodiment of the invention.

The embodiment of the apparatus shown in FIG. 2 utilizes a gas circulating means 15 which is incorporated in the laser housing, the halogen gas supply, or the conduits. It may be embodied, for example, by a gas circulating compressor or a fan. The gas circulating means 15 and the collecting receptacle 11 are connected to the gas reservoir 10 through a circuit which can be blocked by means of the valves V2 and V3.

Optionally, a particle filter 16 may protect the compressor or fan and the collecting receptacle 11 from the entry of any dust particles originating in the gas reservoir 10.

For halogen injection, first the collecting receptacle 11 previously evacuated is filled with the desired amount of halogen through valve V1, while valves V2 and V3 are closed. Subsequently valve V1 is closed. The gas circulating means 15 is activated and valves V2 and V3 are opened. The gas circulating means 15 generates a pressure difference which causes gas to flow from the collecting receptacle 11 into the gas reservoir 10 so that the halogen is conveyed quickly into the reservoir. As a rule, therefore, valves V2 and V3 can be closed again and the gas circulating means 15 switched off after just a few seconds.

In this case, too, the collecting receptacle 11, in which now the prevailing pressure is that of the gas reservoir, can be evacuated once more upon closing of the valves V2 and V3, preferably by a vacuum device (not shown) connected to the halogen gas supply. Thereupon the collecting receptacle 11 is ready for another injection of halogen gas.

Figure 3:
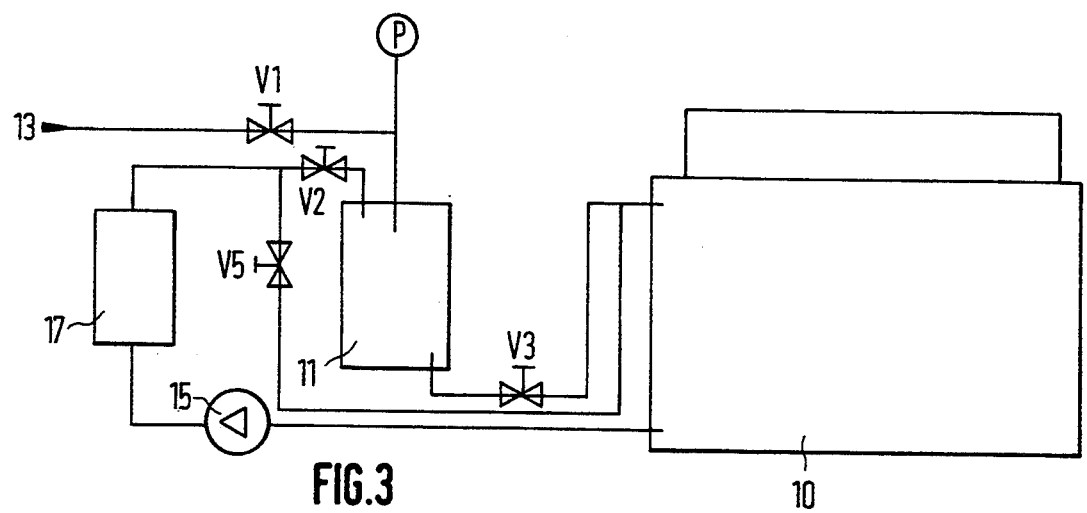
FIG. 3 shows a fourth embodiment of the invention.

FIG. 3 illustrates an excimer laser operating with at least one gas scrubber 17.

During normal operation of the laser, the gas circulating means 15 causes the gas from the gas reservoir 10 to be passed by way of a valve V5 in a circuit through the gas scrubber 17. The latter may be embodied, for example, by a cooling trap for kryogenic cleansing. An alternative scrubbing process is by chemical adsorption using an adsorption column or the like which, however, also withdraws halogen gas from the circuit so that replacement by halogen injection is required. Another possible means of cleansing consists in the provision of mechanical or electrostatic particle or dust filters. Furthermore, a plurality of different scrubbers can be installed in series in the gas circuit. During normal operation, i.e. without refilling of halogen and with valves V2 and V3 closed, the gas, having passed the gas scrubber 17, is returned to the gas reservoir 10 through a conduit adapted to be blocked by a valve V5.

For halogen injection, first valve V1 is opened, while valves V2 and V3 remain closed, until a pressure P suitable for the halogen gas injection is attained in the previously evacuated collecting receptacle 11. Upon closing of valve V1, both valves V2 and V3 are opened and valve V5 is closed. Purified laser gas from the gas scrubber 17 now entrains halogen on its way into the gas reservoir 10. Upon completion of the injection procedure, valves V2 and V3 are closed and valve V5 is opened. V1 is manipulated to evacuate the collecting receptacle 11 once again.

Figure 4:
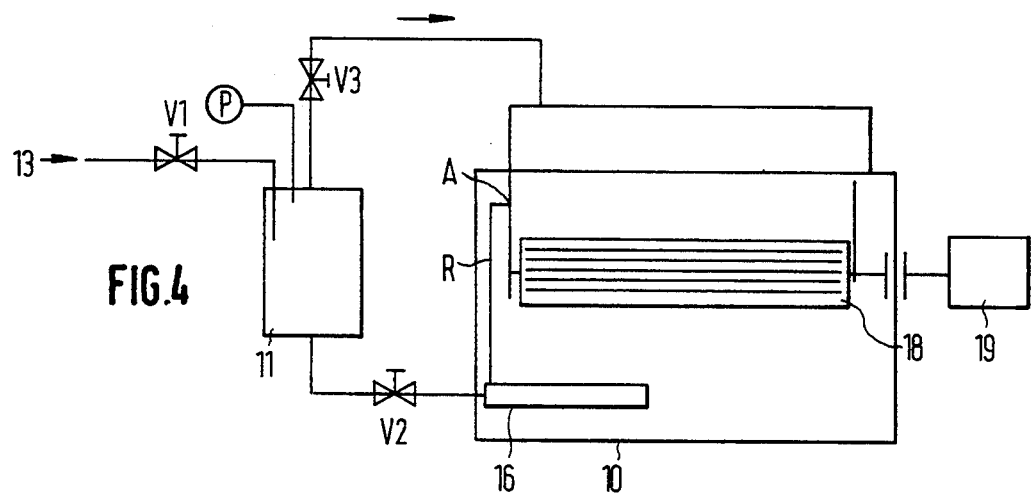
FIG. 4 shows a fifth embodiment of the invention.

An especially preferred modification of the invention is presented in FIG. 4 which shows a gas circulating means 18 within the gas reservoir 10. This gas circulating means 18 operates while the laser is operative (with the aid of drive means 19) so as to establish gas flow between the electrodes. Moreover, the gas circulating means which may take the form of a fan generates a static pressure difference. The gas circulating means 18 is tapped by a pipeline R, e.g. in the sidewall as shown at point A. This tap point A is located at a place of increased static pressure in the gas reservoir 10. The pipeline R forms a circuit, thereby connecting the gas circulating means 18 to an electrostatic or mechanical particle or dust filter 16 inside or outside the gas reservoir (shown in FIG. 4 as being disposed within the gas reservoir) and to the collecting receptacle 11 which is located downstream thereof. Two valves, V2 and V3, arranged upstream and downstream, respectively, of the collecting receptacle 11 make it possible to block the circuit.

During normal laser operation, with valves V2 and V3 in the open position, gas flows through the particle filter 16 and the collecting receptacle 11.

When a halogen injection is needed valves V2 and V3 are closed. The collecting receptacle 11 is evacuated through valve V1 (by means of a vacuum device (not shown) which may be connected to the halogen gas supply) and subsequently pressurized to the required value by halogen gas from the halogen gas supply 13. Valves V2 and V3 are opened again when valve V1 has been closed, and halogen gas is transferred from the collecting receptacle 11 into the gas reservoir 10.

Figure 5:
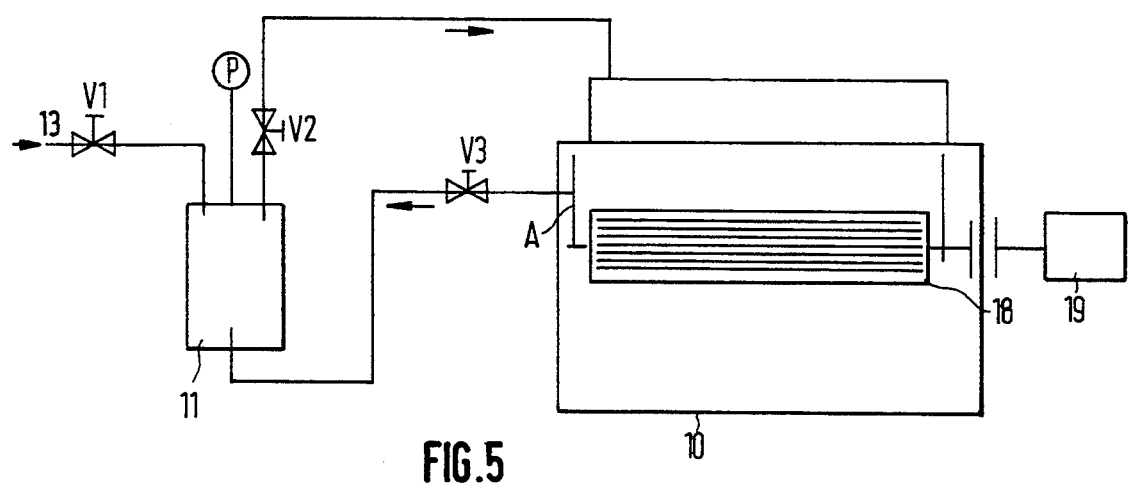
FIG. 5 shows a sixth embodiment of the invention.

FIG. 5 shows a gas circulating means 18 disposed inside the laser gas reservoir 10 and connected through a separate dust filter conduit to a dust or particle filter which may be of the electrostatic or mechanical type (not shown in FIG. 5), e.g. at point A. Parallel to A, a branch is provided at the conduit itself or in the vicinity thereof to form a gas circuit passing through the collecting receptacle 11 and including shutoff valves V2 and V3. These valves V2 and V3 are closed during normal laser operation. For halogen injection, the collecting receptacle 11, having been evacuated (evacuating means not shown), is pressurized through the open valve V1 with halogen gas from the halogen gas supply 13 until a given pressure P is reached. V1 is closed during injection of halogen gas, while V2 and V3 are opened. The gas flow through point A into the gas reservoir, setting in upon equalization of the pressures, entrains the halogen gas from the collecting receptacle 11 into the gas reservoir 10 where it disperses rapidly due to the circulating flow. The influx into the gas reservoir 10 can be provided at the top or below the gas circulating means.

The halogen injection flow through the collecting receptacle 11 thus takes place, as required, in parallel with and independently of the gas flow through the particle filter.

What is claimed is:

1. A method of refilling the gas reservoir of an excimer laser with halogen gas, comprising the following steps:

(a) halogen gas from a halogen gas supply is introduced into an evacuated collecting receptacle, at a lower pressure than the operating pressure in the gas reservoir, (b) a conduit between the collecting receptacle and the halogen gas supply is blocked by closing a valve, (c) the collecting receptacle is connected to the gas reservoir of the excimer laser by opening one or more valves, (d) a gas conduit between the collecting receptacle and the gas reservoir is blocked by closing the valve or valves, (e) the collecting receptacle is evacuated.

2. The method as claimed in claim 1, wherein a buffer gas or noble gas, at higher pressure than the pressure prevailing in the gas reservoir of the excimer laser, is introduced into the collecting receptacle during step (c).

3. The method as claimed in claim 1, wherein the gas from the collecting receptacle is pumped by a gas circulating means and through a gas circuit into the gas reservoir during step (c).

4. The method as claimed in claim 3, wherein a flow of gas and a static pressure difference is generated within the gas reservoir of the excimer laser by a gas circulating means, the pressure differential in step (c) causing the gas which flows in a circuit through the filter and the collecting receptacle to be directed into the gas reservoir.

5. The method as claimed in claim 3, wherein the gas from the gas reservoir of the excimer laser is cleansed of impurities.

6. The method as claimed in claim 5, wherein gas from the gas reservoir of the excimer laser, during step (c), passes a scrubber before entering into the collecting receptacle, whereupon a valve in a bypass conduit is opened after closing of the valves in accordance with step (d), to connect the scrubber directly to the gas reservoir, bypassing the collecting receptacle.

7. The method as claimed in claim 1, wherein a flow of gas and a static pressure difference is generated within the gas reservoir of the excimer laser by a gas circulating means, the pressure differential in step (c) causing the gas which flows in a circuit through the filter and the collecting receptacle to be directed into the gas reservoir.

8. An excimer laser comprising a gas reservoir in which a gas discharge is effected with the participation of halogen gas, wherein a collecting receptacle communicates both with the gas reservoir and a halogen gas supply through conduits provided with shutoff valves and wherein the collecting receptacle is disposed in a gas circuit which is connected to the gas reservoir through shutoff valves and in which a gas circulating means is arranged.

9. The excimer laser as claimed in claim 8, wherein the gas circulating means is a gas circulating compressor or a fan.

10. The excimer laser as claimed in claim 8, wherein a particle filter is connected upstream or downstream of the gas circulating means.

11. The excimer laser as claimed in claim 8, wherein means for cleaning the laser gas of impurities additionally communicates with the gas reservoir through a bypass conduit which bypasses the collecting receptacle and is provided with a shutoff valve.

12. The excimer laser as claimed in claim 11, wherein the particle filter is arranged in the conduits of the gas circuit.

13. The excimer laser according to claim 8, wherein the collecting receptacle is provided with a heater.

14. An excimer laser comprising a gas reservoir in which a gas discharge is effected with the participation of halogen gas, wherein a collecting receptacle communicates both with the gas reservoir and a halogen gas supply through conduits provided with shutoff valves and wherein the collecting receptacle is disposed in a gas circuit which is connected to the gas reservoir through valves, and wherein a gas circulating means is disposed in the gas reservoir.

15. The excimer laser according to claim 14, wherein the collecting receptacle is provided with a heater.

* * * * *